United States Patent
Ackerman et al.

(10) Patent No.: US 7,353,537 B2
(45) Date of Patent: Apr. 1, 2008

(54) SECURE TRANSPARENT VIRTUAL PRIVATE NETWORKS

(75) Inventors: Mark D. Ackerman, Eagle Mountain, UT (US); Hashem Mohammad Ebrahimi, Salt Lake City, UT (US); Baber Amin, Provo, UT (US)

(73) Assignee: Novell, Inc., Provo, UT (US)

( * ) Notice: Subject to any disclaimer, the term of this patent is extended or adjusted under 35 U.S.C. 154(b) by 753 days.

(21) Appl. No.: 10/813,990

(22) Filed: Mar. 31, 2004

(65) Prior Publication Data

US 2005/0246519 A1    Nov. 3, 2005

(51) Int. Cl.
*H04L 29/00* (2006.01)

(52) U.S. Cl. ......................................... 726/15; 713/153
(58) Field of Classification Search .................. 726/15
See application file for complete search history.

(56) References Cited

U.S. PATENT DOCUMENTS

| | | | | |
|---|---|---|---|---|
| 6,079,020 A | * | 6/2000 | Liu ............................... | 726/15 |
| 6,092,200 A | | 7/2000 | Muniyappa et al. ......... | 713/201 |
| 6,654,347 B1 | | 11/2003 | Wiedeman et al. .......... | 370/241 |
| 6,693,878 B1 | | 2/2004 | Daruwalla et al. .......... | 370/237 |
| 6,704,282 B1 | | 3/2004 | Sun et al. .................... | 370/235 |
| 2003/0149787 A1 | * | 8/2003 | Mangan ....................... | 709/238 |
| 2004/0034702 A1 | | 2/2004 | He .............................. | 709/224 |

FOREIGN PATENT DOCUMENTS

| | | |
|---|---|---|
| EP | 1304830 A2 | 4/2003 |
| EP | 1583316 B1 | 4/2007 |
| WO | WO-0215514 A2 | 2/2002 |

OTHER PUBLICATIONS

"European Search Report, Application No. EP 05 10 1072, date mailed Jun. 28, 2005", 3 Pages.
"Virtual Private Networking: An Overview", http://www.microsoft.com/ntserver/commserv/default.asp, (1998),1-19.

* cited by examiner

*Primary Examiner*—Matthew B Smithers
(74) *Attorney, Agent, or Firm*—Schwegman, Lundberg & Woessner, P.A.

(57) ABSTRACT

Techniques are provided for managing communications associated with Virtual Private Networks (VPNs). One or more local clients who attempt to communicate with one or more remote clients via a VPN are serviced by local and remote transparent VPN services. The services intercept VPN communications and, in some embodiments, satisfy the communications via local cache. In instances where the VPN communications cannot be satisfied from the cache, the services translate the intercepted communications and securely communicate with one another for purposes of interfacing the local clients with the remote clients via the VPN.

26 Claims, 4 Drawing Sheets

SECURE TRANSPARENT VIRTUAL PRIVATE NETWORKS

FIELD OF THE INVENTION

The invention relates generally to network security, and more specifically to techniques for managing Virtual Private Network (VPN) communications.

BACKGROUND OF THE INVENTION

The need for creating secure logical networks over public and insecure communication lines, such as the Internet, continues to grow. Organizations desire and many times require secure communications with remote clients or services. As a practical matter, dedicated communication lines and equipment are not viable options, since these are unnecessarily expensive and require ongoing maintenance and support. Thus, organizations have opted for a less expensive option and an easier option to implement and deploy. This option is referred to as a Virtual Private Network (VPN).

A VPN uses an insecure network (e.g., Internet or public telecommunications infrastructure) for providing secure communications between remote clients or services. A VPN requires participants to have a common infrastructure to support common encryption, decryption, security, and certain protocols. Data is encrypted from one participant and tunneled using a secure protocol to another participant, where that data is decrypted and consumed. In some cases, even the address of the participants in a VPN is encrypted.

With VPN techniques there are local computing environments associated with local clients or services and a remote computing environments associated with remote clients of services. Conventionally, each local client needs to support VPN communications and directly establish secure communications (e.g., Secure Sockets Layer (SSL) or Transport Layer Security (TLS)) with a VPN server. This means each local client needs client-side software and a custom configuration in order to participate in a desired VPN with a remote client or service.

As is readily apparent, implementation of conventional VPN techniques within local networking environments can be challenging and time consuming, since each client of the local environment needs to be configured, maintained, and supported. However, often there is little concern with the security of communications being compromised within a local and trusted networking environment.

That is, security concerns are mainly associated with specific communications exiting and coming into the local networking environment over the insecure network connection (e.g., Internet). Thus, managing VPN techniques at each individual local client or service within the local networking environment is excessive and not necessary in order to ensure proper security. In other words, a single local service could ensure that all local clients participating within a VPN distribute and receive secure communications over the insecure network with desired remote clients or services. In this manner, clients or services can participate in a VPN via the service without having any individual and specific configuration, support, or maintenance being required.

Another drawback to traditional VPN techniques is that caching of data communicated during a VPN session is not available. This means that clients, who manage their own VPN session experience slower communication rates with their desired remote clients or services. Thus, there is a need for accelerating data delivery via local caching to local clients during VPN sessions.

Thus, improved techniques for transparently administering VPNs are needed.

SUMMARY OF THE INVENTION

In various embodiments of the invention, techniques are presented for transparently administering a VPN. A VPN of this invention includes local clients or services, a local transparent VPN service, a remote transparent VPN service, and remote clients or services.

The local transparent VPN service receives communications directed by local clients or services to pre-defined ports. These ports are reserved or associated with VPN communications. When a local client directs a communication to one of these ports, a switch or router relays the communication to the local transparent VPN service for processing. The local transparent VPN service inspects the communication for purposes of determining if the communication can be satisfied from data residing in local cache, and if so such data is delivered immediately to the initial requesting local client from the local cache.

If the communication can not be satisfied from the local cache, then the local transparent VPN service identifies the specific VPN and remote client or service for which the communication is directed, translates the communication and any addresses of the participants appropriately and forwards the encrypted communication via SSL or TLS to a remote transparent VPN service, which performs features similar to the local transparent VPN service for the remote client.

DETAILED DESCRIPTION OF THE INVENTION

Figure 1:
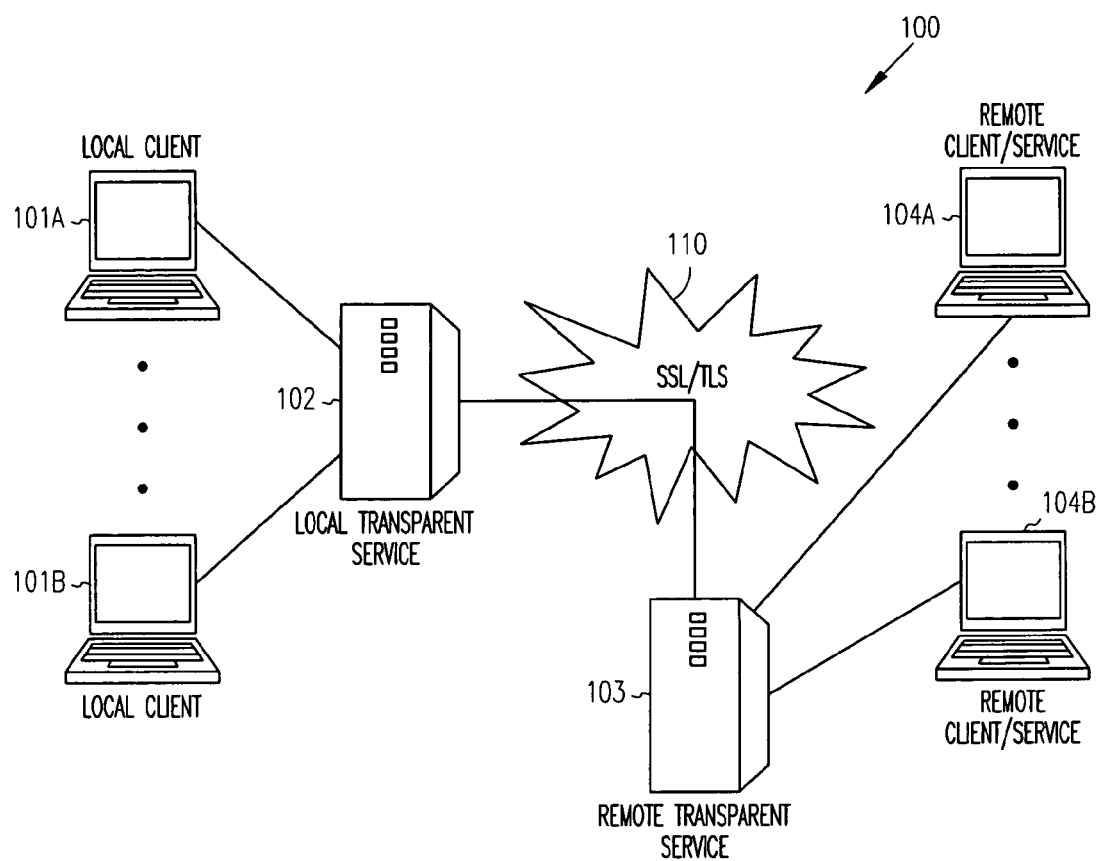
FIG. 1 is a diagram representing an architectural layout for a Virtual Private Network (VPN) managing system.

As used herein and below a "client" is an electronic application, "service", proxy, a computing device, or system which may be automated or may be manually interacted with by an end-user.

The phrases "local networking environment" and "external (remote) networking environment are presented herein and below. Local networking environment refers to physical or logical network devices and services which are configured to be local to the clients and which interface with the local clients. This does not mean that any particular local networking environment of a particular local client physically resides in the same geographic location of the local client or proximately resides within the same geographic location of the local client, although in some embodiments this can be the case. Local networking environments can be dispersed geographically from the physical location of the local client and form a logical local networking environment of the local client. An external networking environment is a network which is not considered local to the local client. A remote service is associated with external or remote networking environments, these external or remote networking environments are considered external and remote vis-à-vis a local client's networking environment. Moreover, the terms local and remote or external are relative terms and depending upon who is performing any particular transaction. Thus, a remote client can have a local network environment with respect to the remote client.

Secure communications refer to communications that require specific secure protocols (e.g., SSL, TLS, etc.), which are communicated over predefined ports (e.g., 443, etc.) associated with communication devices. Secure communications may also refer to any form of encryption or custom encryption and agreed upon protocol that is used to mutually establish secure communications between two or more entities. Thus, in many cases data communication using secure communications requires encryption. In some instances this encryption uses Public and Private Key Infrastructure (PKI) techniques and which may also use digital certificates and digital signatures. Insecure communications refer to communications that use insecure protocols (e.g. HTTP, etc.) and which use different defined ports (e.g., 80, etc.) of communication devices from that which are used with secure communications. Generally, insecure communications will also not include encryption.

A VPN is a logical network where two or more clients or services interact over an insecure network (e.g., Internet) in a secure fashion. The secure fashion may entail using specific ports (e.g., 443, etc.), using mutually agreed upon protocols (e.g., SSL, TLS, custom protocols, etc.), and using mutually agreed upon encryption and decryption. Traditionally, a VPN requires each client to include configuration, secure protocols, keys, and the like which reside on each client participating within a VPN. This is not the case with the teachings presented herein. A local transparent VPN service acts on behalf of a plurality of clients within local networking environments in order to manage VPN traffic. Remote clients and services are interacted with via the VPN through a remote transparent VPN service.

Data acceleration refers to the ability to cache data in advance of a need or request for that data. Any conventional caching services and managers can be used in the caching techniques presented herein and below with embodiments of this invention. Thus, by way of example, a cache manager can determine when to flush certain data from a cache and determine when certain data residing within the cache is stale and needs refreshed or updated. Generally, data is accelerated with caching techniques because the cache resides closer to a client and houses needed data in memory which is more quickly referenced and accessed. Thus, if a request for particular data can be satisfied from a local cache, a requesting client experiences a faster response time for that data and it appears to the client as if the data has been accelerated to satisfy a data request.

Various embodiments of this invention can be implemented in existing network products and services. For example, in some embodiments, the techniques presented herein are implemented in whole or in part in the iChain®, Border Manager®, and Excelerator® products distributed by Novell, Inc., of Provo, Utah.

Of course, the embodiments of the invention can be implemented in a variety of architectural platforms, systems, or applications. For example, portions of this invention can be implemented in whole or in part in any distributed architecture platform, operating systems, proxy services, or browser/client applications. Any particular architectural layout or implementation presented herein is provided for purposes of illustration and comprehension only and is not intended to limit the various aspects of the invention.

FIG. 1 is a diagram representing one example architectural layout 100 for a Virtual Private Network (VPN) managing system. The architecture 100 is implemented within a distributed client-server architecture. The purpose of the architecture 100 is to demonstrate how various entities can be configured and arranged for interacting and managing a VPN. In some cases, entities permit acceleration of data acquired via the VPN.

The architecture 100 includes one or more local clients 101A-101B, a local transparent VPN service 102, a remote transparent VPN service 103, and one or more remote clients/services 104A-104B. It should be noted that the local clients 101A-101B may also be services. The local transparent VPN service 102 communicates directly with the remote transparent VPN service 103 over an insecure network (e.g., Internet) using secure communications, such as SSL, TLS or any other mutually agreed upon protocol 110.

During operation of the entities within the architecture 100, the local clients 101A-101B are not preconfigured with VPN capabilities or specialized software for processing VPN communications. Instead, the local clients 101A-101B attempt to communicate with a specific remote client/service 104A or 104B or a group of remote clients/services 104A-104B. The local client 101A or 101B may or may not know that its communication with the desired remote client/service 104A or 104B is being achieved securely via a VPN. For example, a forward or transparent proxy may detect local client 101A or 101B communications and direct those communications to the secure port (e.g., 443) associated with VPN traffic. The secure communication port is monitored by a router or switch (not shown in FIG. 1), which detects a destination address for a remote client/service 104A or 104B communication that is associated with a VPN. This causes the router or switch to relay the communication to the local transparent VPN service 102.

The local transparent VPN service 102 inspects the intercepted communication and determines whether the information or data desired can be satisfied out of a local cache, and if so delivers that information or data to the local client 101A or 101B from the local cache. In these situations, since the local transparent VPN service 102 acts as a transparent intermediary for the local clients 101A-101B, the local transparent VPN service 102 is capable of communicating with the remote transparent VPN service 103 in advance of any specific communication from one of the local clients 101A or 101B, such that data can be pre-acquired and populated in the local cache, managed, and accessed by the local transparent VPN service 102.

Traditionally, VPN communications were not capable of being cached within local environments of clients, since the secure communications tunnels between clients prevented any other service acting on behalf of the client to cache desired data. However, with the teachings presented herein, clients 101A-101B and 104A-104B can experience accelerated data delivery during VPN communications.

If an intercepted VPN communication cannot be satisfied by a local cache, then the local transparent VPN service 102 inspects the communication to determine the proper VPN being requested based on the addresses of the participants (e.g., local and remote clients or services 101A-101B and 104A-104B). This permits the local transparent VPN service 102 to identify a needed remote transparent VPN service 103 with which the local transparent VPN service 102 communicates.

Next, the local transparent VPN service 102 performs the needed encryption on the communication and optionally on the addresses of the participants. The encryption is based on the identified VPN associated with the participants and their addresses. The encrypted communication is then sent over the insecure network (e.g., Internet) using a secure communications protocol (e.g., SSL, TLS, any mutually agreed upon protocol, etc.).

The encrypted communication is detected on a secure port (e.g., 443) within the remote networking environment and, in manners similar to what was discussed above, is forwarded to the remote transparent VPN service 103. The remote transparent VPN service 103 decrypts the communication and addresses, if applicable, and forwards the communication to needed remote clients/services 104A-104B for processing.

The targeted remote client/service 104A or 104B acts on the communication and generates a response which it directs to the local client 101A or 101B. This response is intercepted and directed to the remote secure communication port. There, the reply is intercepted again and relayed to the remote transparent VPN service 103, where it is encrypted and sent from the remote transparent VPN service 103 over the insecure network using a secure communications protocol (SSL or TLS 110) to the local transparent VPN service 102. The local transparent VPN service 102 can cache the response and its data within a local cache and delivers the response to the original requesting local client 101A or 101B.

The local transparent VPN service 102 and the remote transparent VPN service 103 communicate directly with one another over an insecure network using secure communications (e.g., protocols and/or encryption and decryption). Each transparent VPN service 102 or 103 can service a plurality of clients or services 101A-101B and 104A-104B which engage in VPN interactions. Thus, individual clients/services 101A-101B or 104A-104B need not be preconfigured, managed, and supported for VPN communications and still can benefit and participate in VPNs with the teachings presented herein. Additionally, the clients/services 101A-101B and 104A-104B can, with some embodiments, experience accelerated data deliver during a VPN session, since the transparent VPN services 102 or 103 can cache data in advance of a need to satisfy a received communication.

Figure 2:
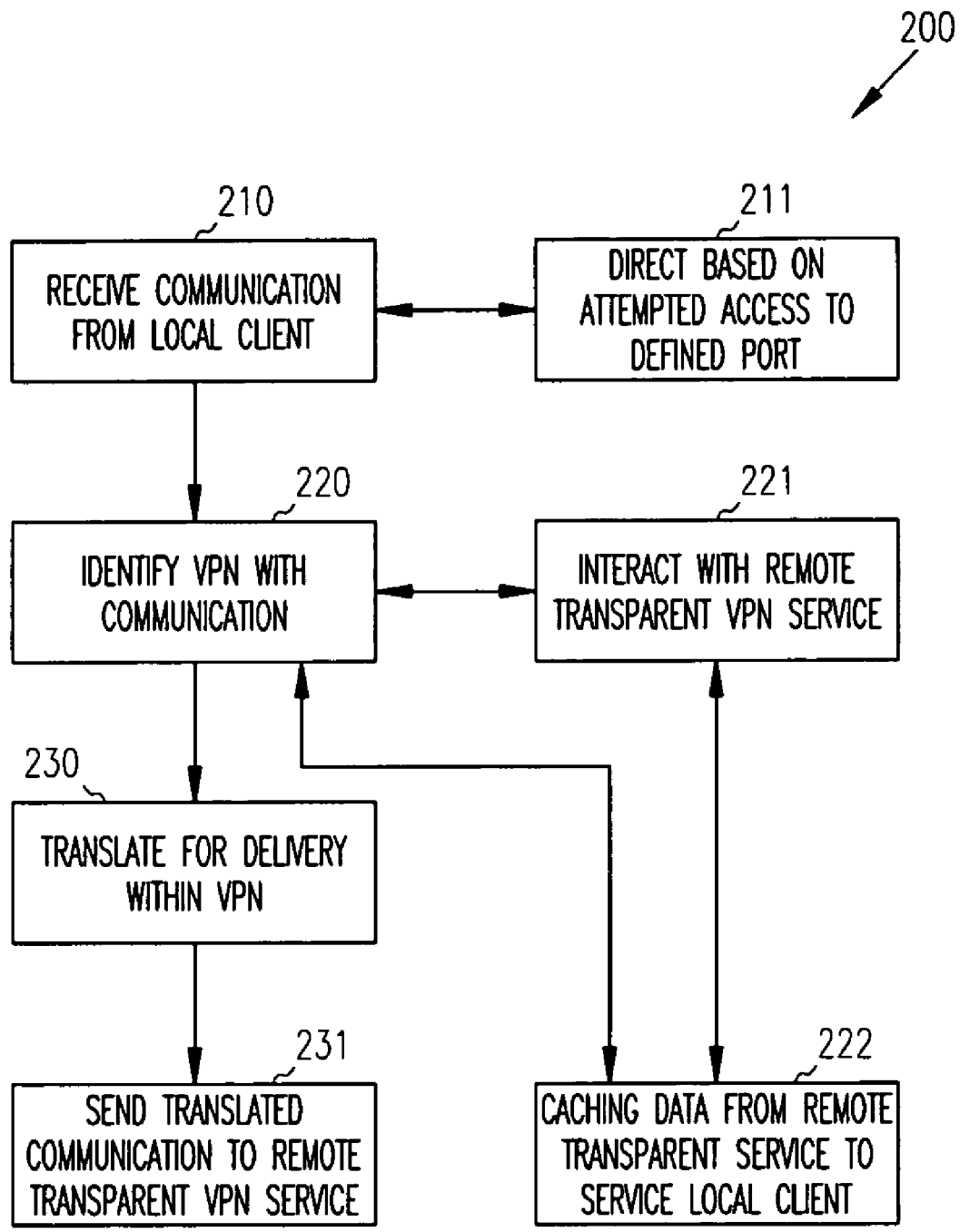
FIG. 2 is a flowchart representing a method for managing VPN communications.

FIG. 2 is a flowchart of one method 200 for managing VPN communications. The method 200 is implemented in a computer readable medium and is accessible over a network. In one embodiment, the method 200 is implemented as a local transparent VPN service, which is designed to interact with one or more local clients or services and designed to securely interact with a remote transparent VPN over an insecure network. The remote transparent VPN service is another processing instance of the method 200, which resides and processes in an external or remote networking environment. The processing of the method 200 is referred to as a "local transparent VPN service" herein and below.

In one embodiment, the transparent VPN service is a service which the local clients or services are not aware of. That is, local clients are not preconfigured to directly interact with the local transparent VPN service. In this situation a router, switch, or proxy can be used to forward communications from the local clients to the local transparent VPN service. In a different embodiment, the local clients are configured to directly send VPN communications to the local transparent VPN service.

A local client or service issues a communication request for a remote client of service. This communication is directed or redirected on behalf of the local client to a specific secure communications port (e.g., 443, etc.), where a router or switch relays or forwards the communication to the local transparent VPN service. Accordingly, at 210, the local transparent VPN service receives a communication from a local client, which is directed to a remote client or service. Further, at 211, this communication is detected, in some embodiments, based on the local client's attempt to access a defined port with the communication.

The communications can also be based on the type of communication taking place. For example, in some embodiments, maybe only File Transfer Protocol (FTP) or Transmission Control Protocol (TCP) communication types are inspected and processed by the local transparent VPN service. Accordingly, processing can be based on the use of a specific communication port, based on a specific type of communication (e.g., FTP, TCP, etc.), or based on a combination of a specific communication port and a specific type of communication.

At 220, the local transparent VPN service receives the communication and identifies the VPN associated with the communication. To do this, the local transparent VPN service inspects the address or identity of the local client and the address or identity of the remote client or service. This information is looked up in a table or other data structure to acquire the identity of the specific VPN used between the local client and the remote client or service.

Once the specific VPN is identified, the local transparent VPN service can acquire the encryption, key, and any certificate information necessary to interact with a remote transparent VPN service at 221. The remote transparent VPN service is a remote processing instance of the local transparent VPN service. That is, the remote transparent VPN service is a local transparent VPN service with respect to the remote client or service.

In some embodiments, at 222, the original received communication is inspected by the local transparent VPN service for purposes of determining whether it can be satisfied from a local cache. In this way, the local transparent VPN service and the remote transparent VPN service interact with one another in advance and at different times than what may be requested by a local client and a remote client or service.

During these interactions, the local transparent VPN service acquires data associated with the remote client or service from the remote transparent VPN service and houses that data in a local cache that resides within the local networking environment of the local client and the local transparent VPN service. Thus, when the local client issues a communication request, the local transparent VPN service can inspect the local cache to determine if that communication can be satisfied locally. By doing this, the local client experiences accelerated data delivery during a VPN managed transaction. Conventionally, this has not been achievable.

In a like manner the remote transparent VPN service can acquire data from the local client via the local transparent VPN service and cache that data in a remote cache (local cache vis-à-vis the remote client or service and remote transparent VPN service), where that data can be used to accelerate data delivery to the remote client or service which interacts via the VPN with the local client.

At 230, the local transparent VPN service translates the original received communication and, optionally, any addresses of the parties involved (e.g., local and remote clients or services) into encrypted formats required by the VPN. That encrypted information is then sent using secure communications (e.g., protocols and/or encryption and decryption) to the remote transparent VPN service. The remote transparent VPN service receives that encrypted communication, decrypts it, identifies the address of the desired remote client or service, and forwards the decrypted version locally to that remote client or service. The remote client or service responds via a defined secure communication port (either directly or indirectly) within the remote networking environment. That response is relayed to the remote transparent VPN service, where it is translated and sent with secure communications to the local transparent VPN service.

Interactions between the local and remote transparent VPN services occur as long as the local and remote clients or services are interacting via the identified VPN. The transparent VPN services acts as intermediaries for the local and remote clients or services. A single transparent VPN service can service a plurality of clients or services which are within the local networking environment of that transparent VPN service.

Conventionally, a VPN transaction required each client or service to be specifically configured, maintained, and supported for purposes of participating in VPN communications. With the teachings of this invention, this is no longer required since all clients or services of one environment can participate in a variety of VPN-defined communications with all clients or services of a different environment and all that is needed is a single transparent VPN service, which has an operational instance processing in each environment. Thus, two services can achieve what has previously required modification to all clients and services participating in VPN-defined communications.

In fact, in some embodiments, the local and remote clients are not even aware of the secure communications and the VPN being used in between their communications with one another. Thus, as far as the clients are concerned they believe that they are communicating insecurely with one another, when in fact communication between them is occurring via a VPN over a public or otherwise insecure network via the transparent VPN services.

Figure 3:
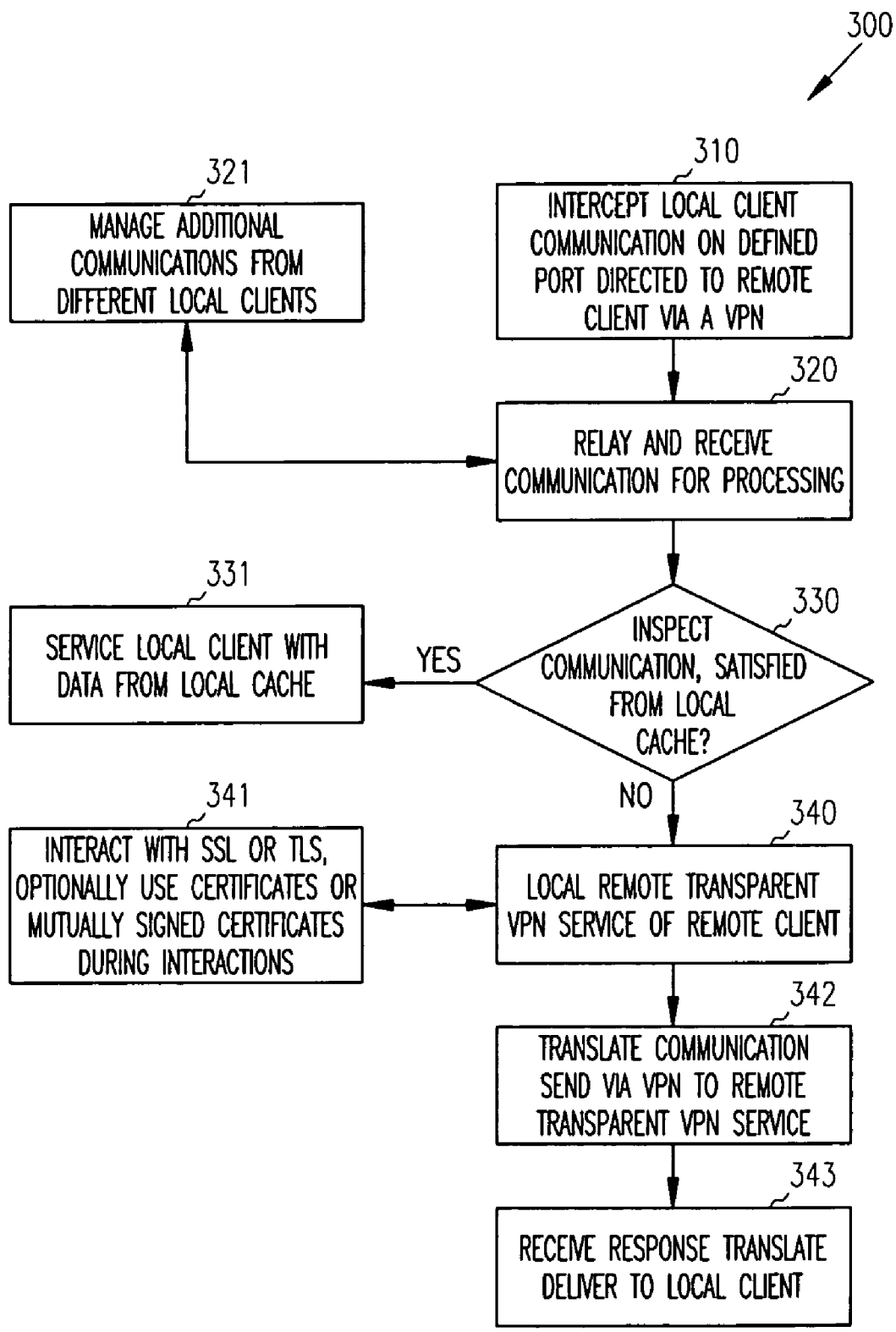
FIG. 3 is a flowchart representing another method for managing VPN communications.

FIG. 3 is a flowchart of another method 300 for managing VPN communications. The method is implemented in a computer readable medium and is accessible over any network or combination of networks. Similar, to the method 200 of FIG. 2 above, the method 300 can be viewed as a local transparent VPN service that interacts with another processing instance of itself (defined as a remote transparent VPN service) over a network. The two processing instances of the transparent VPN services manage VPN communications for a plurality of clients and services.

At 310, the local transparent VPN service receives an intercepted local client communication (can also be a local service). The communication is intercepted by detecting it on a predefined port which is monitored or listened to by the local transparent VPN service or which is monitored by a router or switch that automatically forwards communications to the local transparent VPN service.

The local transparent VPN service can be used to manage additional communications associated with a plurality of different local clients, as depicted at 321. That is, the local transparent VPN service intercepts and manages VPN communications for local clients or services who are within the local networking environment of the local transparent VPN service.

At 320, the intercepted communication from the local client is relayed and received for processing by the local transparent VPN service. At 330, that communication is inspect to determine if it can be satisfied from local cache being managed and maintained by the local transparent VPN service.

The local transparent VPN service interacts with its counterpart, the remote transparent VPN service, using secure communications (e.g., protocols (SSL, TLS, etc.) and/or encryption and decryption). Thus, the local transparent VPN service can pre-acquire data from one or more remote clients or services via the remote transparent VPN service. Similarly, the remote transparent VPN service can pre-acquire data from one of more local clients of services via the local remote transparent VPN service. The data is stored and managed in caches, one cache local to the local client and another cache local to the remote client or service.

If at 330, the received communication can be satisfied from the cache, then, at 331, the local client is serviced with data from the local cache. In this manner, the local client can, in some instances, experience accelerated data delivery associated with VPN interactions. This has not conventionally been achievable.

However, if at 330, the received communication cannot be satisfied from the local cache then, at 340, the proper remote transparent VPN service is located. The local transparent VPN service can interact with a plurality of remote transparent VPN services, so, at 340, the identity of the needed remote transparent VPN service is acquired based on the remote client or service for which the original communication is being directed.

The local transparent VPN service and the remote transparent VPN service interact with one another via secure communications, such as SSL or TLS. In some instances for added security digital certificates can be exchanged and in some instances the communications or certificates can be mutually or unilaterally digitally signed, as depicted at 341.

Once the identity of the remote transparent VPN service is known, the communication is translated (e.g., encrypted) and sent via the proper VPN to the target remote transparent VPN service, at 342. The translated communication is sent via secure communications (e.g., SSL or TLS). Once the encrypted communication is received by the remote transparent VPN service, it is decrypted and sent to the proper remote client or service for processing.

Once processed, the remote transparent VPN service intercepts the remote client or service's response, encrypts it and sends it securely via the VPN using secure communications to the local transparent VPN service. The local transparent VPN service, decrypts it, optionally caches the data associated with it in local cache, and delivers it to the originally requesting local client.

The transparent VPN services act as VPN intermediaries or managers for VPN communications. This permits data during VPN communications to be cached and accelerated for deliver to clients or service and permits a plurality of clients or services to actively and beneficially participate in VPN communications without requiring individual maintenance, support, and configuration to achieve the same.

Figure 4:
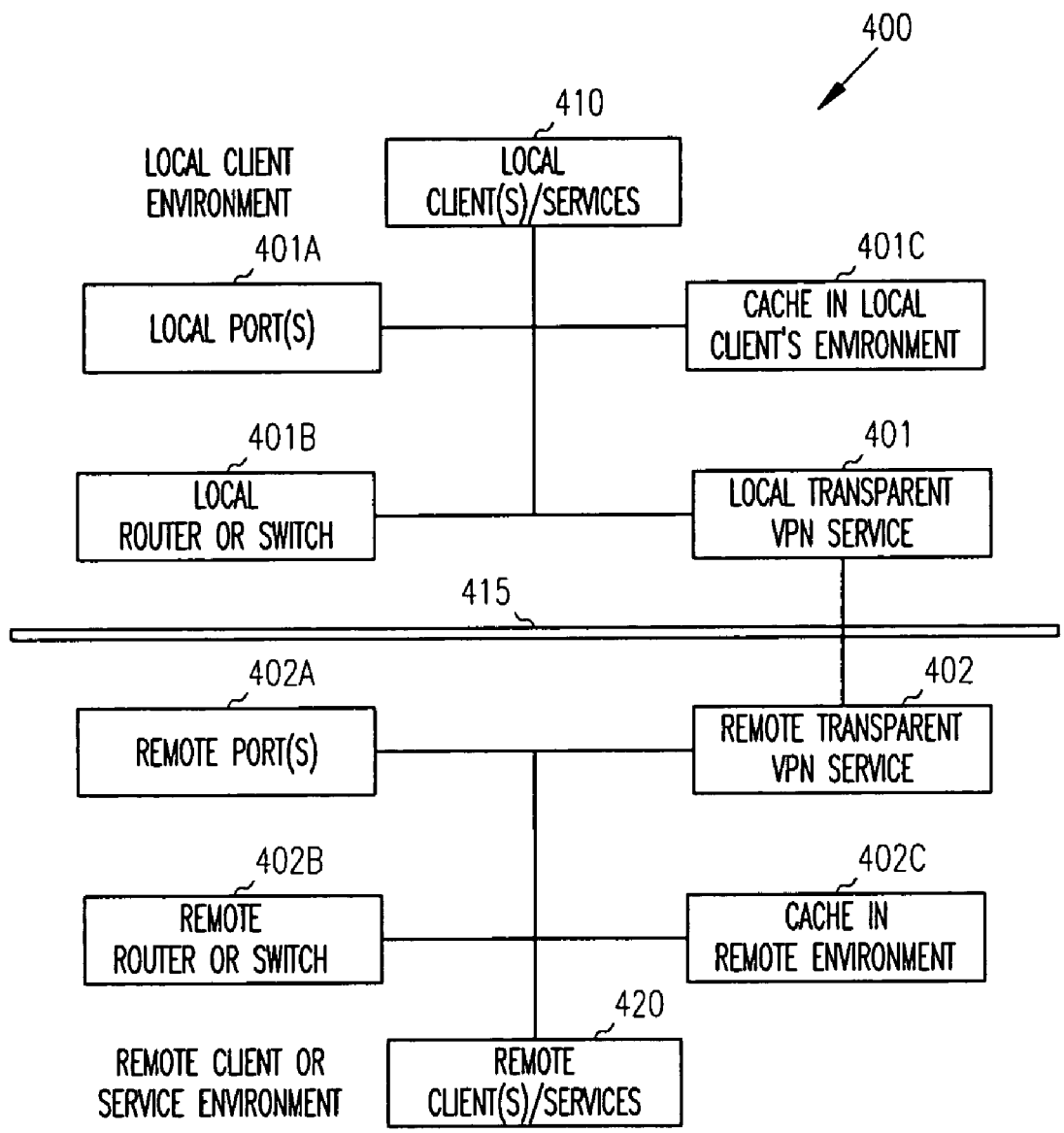
FIG. 4 is a diagram representing a VPN managing system.

FIG. 4 is a diagram depicting a VPN managing system 400. The VPN managing system 400 is implemented in a computer readable or accessible medium and is accessible over any network or combination of networks. In some embodiments, portions of the VPN managing system 400 can be implemented using the techniques presented above with respect to method 200 or method 300 of FIGS. 2-3.

The VPN managing system 400 includes a local transparent VPN service 401 and a remote transparent VPN service 402. In another embodiment, the VPN managing system 400 includes a local transparent VPN service 401 and a local communication port 401A.

The VPN managing system 400 is operational in a local client environment and a remote client or service environment. Each separate environment can include one or more identical entities. For example, the local client environment can include local communication ports 401A, local routers or switches 401B, and local cache 401C. At the same time, the remote client or service environment can include remote ports 402A, remote routers or switches 402B, and remote cache 402. In some embodiments, one or more entities may be omitted. Additionally, the environments need not be identically replicated, as is depicted in FIG. 4 for purposes of illustration.

The local client environment includes a plurality of clients or services 410. Each of these clients or services 410 can participate in VPN communications over an insecure network 415 with a plurality of remote clients or services 420, which reside in the remote client or service environment. The local and remote clients or services 410 and 420 do not need to be specifically configured to participate in VPN communications; rather, the details of VPN communications are managed by the two transparent VPN services 401 and 402. Each of the transparent VPN services 401 and 402 are capable of multiplexing, encrypting, or decrypting communications occurring between them and sending communications securely via SSL or TLS for purposes of effectuating a desired VPN. In fact, in many instances, the clients may be entirely unaware that they are communicating securely with other remote clients or services 420.

A local client 410 issues a communication to a specific secure communications port 401A. This can be achieved directly (e.g., forward proxy not shown in FIG. 4) or indirectly (e.g., transparent proxy not shown in FIG. 4). The local transparent VPN service 401 listens on that port for VPN activity. Alternatively, a local router or switch 401B detects the activity and based on its type (e.g., FTP, TCP, etc.) or based on where it is headed (e.g., target remote client or service 420) relays or forwards the activity to the local transparent VPN service 401.

Once the local transparent VPN service 401 receives a communication associated with a VPN from a local client or service 410 which is destined for a remote client of service 420 over the insecure network 415, the local transparent VPN service 401 determines the identity of the remote transparent VPN service 402 with which it needs to interact over the desired VPN. Once this is known, the encrypting, decryption, certificate, keys, or multiplexing requirements can be established and the communication can be translated and sent over the insecure network 415 using secure communications (e.g., protocols and/or encryption and decryption).

In some embodiments, the communication can be inspected by the local transparent VPN service 401 for purposes of determining whether it can be satisfied from contents of existing local cache 401C, and if it can be so satisfied, the local client's 410 original communication is immediately responded to with data residing in the local cache 401C. Thus, in some embodiments, client or service 410 and 420 can experience accelerated response time and data delivery, because of the caching abilities of the transparent VPN services 401 and 402. The caching is not limited to the local client environment, since, in some embodiments, the remote transparent VPN service 402 can perform caching using its remote cache 402C on behalf of its remote clients of services 420.

If a communication cannot be satisfied from cache 401C or 402C, then the appropriate transparent VPN service 401 or 402 encrypts and securely transmits the encrypted communication over the insecure network to its counterpart transparent VPN service 401 or 402. Here, the encrypted communication is decrypted or multiplexed and forwarded to the appropriate client or service 410 or 420 for processing and reply. The reply is then processed in the same manner as the communication was processed.

In some embodiments, the transparent VPN services 401 and 402 can interact with digital certificates and/or via digital signatures. In fact, the desired level of security can be configured based on the needs of an organization. The services 401 and 402 interact with one another for purposes of achieving VPN communications on behalf of clients or services 410 and 420 of their environments. Moreover, in some instances, data is cached and provided for accelerated delivery. These benefits have not been achievable with conventional VPN techniques.

Although specific embodiments have been illustrated and described herein, those of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A method for managing Virtual Private Network (VPN) communications, comprising:

receiving a communication from a local client, which is redirected on behalf of the local client by a proxy that the local client is unaware of and the communication is being directed by the local client to a remote client over an insecure network, and wherein the proxy determines on behalf of the local client that communication is to be associated with a VPN;

identifying the VPN associated with the communication;

inspecting a local cache to determine when the communication can be satisfied via the local cache;

translating the communication for delivery within the VPN when the communication is not satisfied from the local cache; and sending, when the communication is not satisfied from the local cache, the translated communication via the VPN to a remote transparent VPN service, which manages VPN traffic for the remote client.

2. The method of claim 1 further comprising, processing the method as a local transparent VPN service, which manages VPN traffic for the local client.

3. The method of claim 1 further comprising, directing the communication from the local client to the method based on the local client attempting to access a defined port, the defined port is associated with a switch or router that relays the communication to the method.

4. The method of claim 1 further comprising, interacting with the remote transparent VPN service to manage additional communications between the local client and the remote client via the VPN.

5. The method of claim 4 further comprising, caching data received from the remote transparent VPN service in the local cache for accelerated delivery to the local client.

6. The method of claim 1 wherein receiving the communication further includes receiving the communication in at least one of a File Transfer Protocol (FTP) format and a Transmission Control Protocol (TCP) format.

7. The method of claim 1 further comprising, communicating with the remote transparent VPN service over the insecure network via Secure Sockets Layer (SSL) or Transport Layer Security (TLS).

8. A method for managing Virtual Private Network (VPN) communications, comprising:
   receiving a communication from a local client which is directed to a remote client associated with a VPN, and wherein the communication is intercepted by a proxy when the local client attempts to send the communication to the remote client and wherein the proxy determines that the communication is to use the VPN; and
   inspecting the communication for determining whether the communication is a request for data that resides in a local cache, and if so, delivering the data to the local client to ensure the local client experiences accelerated data delivery, and if not, locating a remote transparent VPN service associated with the VPN, and wherein the communication is translated into formats used by the VPN and sent securely over an insecure network to the remote transparent VPN service for delivery to the remote client.

9. The method of claim 8 wherein inspecting further includes establishing secure communications with the remote transparent VPN service using at least one of Sockets Layer(SSL) and Transport Layer Security (TLS).

10. The method of claim 8 wherein inspecting further includes identifying the remote transparent VPN service as a service which is managing VPN traffic for the remote client.

11. The method of claim 8 wherein receiving further includes intercepting the communication issued from the local client by using a router or switch, wherein the local client directs the communication to the remote client via a communication port and the router or switch relays the communication to the processing of the method.

12. The method of claim 8 further comprising:
   receiving a response communication from the remote client via the remote transparent VPN service, if the communication had been sent via the VPN because it could not be satisfied from the local cache;
   translating the response based on the formats of the VPN; and
   delivering the translated response to the local client.

13. The method of claim 8 further comprising, managing additional communications associated with the VPN from one or more different local clients which are directed between one or more different remote clients, wherein the remote transparent VPN service manages the additional communications on behalf of the one or more different remote clients.

14. The method of claim 8 wherein receiving further includes intercepting the communication after detecting that the local client is transmitting the communication with a non-Hypertext Transfer Protocol (HTTP).

15. The method of claim 8 further comprising, interacting with the remote transparent VPN service with mutually signed certificates that are exchanged between the method and the remote transparent VPN service during the interactions.

16. A Virtual Private Network (VPN) managing system, comprising:
   a remote transparent VPN service; and
   a local transparent VPN service, wherein the local transparent VPN service intercepts and manages VPN traffic on behalf of one or more local clients via a proxy that determines traffic from the local clients is to be associated with the VPN traffic, and the local transparent VPN service also services communications of those local clients with data in a local cache, if available to provide accelerated data delivery to the local clients, and if the data is not available in the local cache, the local transparent VPN service transmits the communications securely to the remote transparent VPN service for delivery and servicing by one or more remote clients which the remote transparent VPN service manages.

17. The VPN managing system of claim 16 wherein the local transparent VPN service and the remote transparent VPN service interact via at least one of Secure Sockets Layer (SSL) and Transport Layer Security (TLS).

18. The VPN managing system of claim 16 wherein the local transparent VPN service intercepts local VPN traffic on behalf of the one or more local clients by inspecting Transmission Control Protocol (TCP) or File Transfer Protocol (FTP) communications originating from the one or more local clients.

19. The VPN managing system of claim 16 wherein the local transparent VPN service intercepts the VPN traffic through a router or switch which is configured to relay communications on a defined port to the local transparent VPN service.

20. The VPN managing system of claim 16 wherein communications between the local and remote transparent VPN services occur with mutually exchanged certificates.

21. A Virtual Private Network (VPN) managing system, comprising:
   a communication port; and
   a local transparent VPN service, wherein VPN communications directed to the communication port are relayed to the local transparent VPN service, the local transparent VPN service attempts to service the VPN communications from local cache and if attempts fail, the local transparent VPN service securely communicates with a remote transparent VPN service via an insecure network to service the VPN communications, and wherein a proxy that intercepts communications from local clients directed to remote clients directs those communications to the communication port as the VPN communications.

22. The VPN managing system of claim 21 further comprising a router or switch which relays the VPN communications to the local transparent VPN service.

23. The VPN managing system of claim 21, wherein the system resides on a server and services a plurality of the local clients associated with the VPN communications.

24. The VPN managing system of claim 21 wherein the system resides on a single client.

25. The VPN managing system of claim 21 wherein the local transparent VPN service translates and services the VPN communications on behalf of the local clients.

26. The VPN managing system of claim 25 wherein the remote transparent VPN service translates and service the VPN communication on behalf of a one or more of remote clients.

\* \* \* \* \*

UNITED STATES PATENT AND TRADEMARK OFFICE
CERTIFICATE OF CORRECTION

PATENT NO. : 7,353,537 B2  Page 1 of 1
APPLICATION NO. : 10/813990
DATED : April 1, 2008
INVENTOR(S) : Ackerman et al.

It is certified that error appears in the above-identified patent and that said Letters Patent is hereby corrected as shown below:

In column 11, lines 44-45, in Claim 9, delete "Sockets Layer(SSL)" and insert -- Secure Sockets Layer (SSL) --, therefor.

In column 11, line 54, in Claim 11, after "and" delete "the" and insert -- a --, therefor.

Signed and Sealed this

Twenty-ninth Day of July, 2008

JON W. DUDAS
*Director of the United States Patent and Trademark Office*